United States Patent
Lim et al.

(10) Patent No.: US 9,025,307 B2
(45) Date of Patent: May 5, 2015

(54) MULTILAYER CERAMIC ELECTRONIC COMPONENT AND METHOD OF MANUFACTURING THE SAME

(75) Inventors: Jin Hyung Lim, Gyunggi-do (KR); Seok Kyoon Woo, Gyunggi-do (KR); Chung Eun Lee, Gyunggi-do (KR); Doo Young Kim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 132 days.

(21) Appl. No.: 13/565,309

(22) Filed: Aug. 2, 2012

(65) Prior Publication Data
US 2013/0135787 A1 May 30, 2013

(30) Foreign Application Priority Data
Nov. 30, 2011 (KR) .................. 10-2011-0126590

(51) Int. Cl.
| | |
|---|---|
| H01G 4/30 | (2006.01) |
| H01G 4/228 | (2006.01) |
| H01G 4/008 | (2006.01) |
| H01G 4/012 | (2006.01) |
| H01G 4/12 | (2006.01) |

(52) U.S. Cl.
CPC ............... *H01G 4/30* (2013.01); *H01G 4/0085* (2013.01); *H01G 4/012* (2013.01); *H01G 4/12* (2013.01); *Y10T 29/435* (2015.01)

(58) Field of Classification Search
None
See application file for complete search history.

(56) References Cited

U.S. PATENT DOCUMENTS

| | | | | |
|---|---|---|---|---|
| 5,172,299 A | * | 12/1992 | Yamada et al. | ........... 361/321.2 |
| 2011/0141654 A1 | * | 6/2011 | Okada | ........... 361/301.4 |

FOREIGN PATENT DOCUMENTS

| | | |
|---|---|---|
| JP | 08-250369 | 9/1996 |
| JP | 2000-040634 A | 2/2000 |
| JP | 2004-179436 A | 6/2004 |
| JP | 2007-158267 A | 6/2007 |

OTHER PUBLICATIONS

Notice of Office Action Japanese Patent Application No. 2012-166717 dated Oct. 1, 2013.

* cited by examiner

*Primary Examiner* — Dion R Ferguson
(74) *Attorney, Agent, or Firm* — McDermott Will & Emery LLP (57) ABSTRACT

There is provided a multilayer ceramic electronic component, including: a ceramic body including dielectric layers; and first and second inner electrodes disposed to face each other with the dielectric layer interposed therebetween within the ceramic body, the first and second inner electrodes being alternately laminated with a difference in printing widths therebetween, wherein a difference ratio between the printing widths of the first and second inner electrodes is 20 to 80%. According to embodiments of the present invention, a multilayer ceramic electronic component having excellent reliability and withstand voltage characteristics may be realized, by reducing the occurrence of cracking through a reduction in the influence of step height while securing high capacitance.

7 Claims, 6 Drawing Sheets

|  | COMPARATIVE EXAMPLE | INVENTIVE EXAMPLE |
|---|---|---|
| UPPER PORTION | 95% | 94% |
| MIDDLE PORTION | 87% | 93% |
| LOWER PORTION | 98% | 97% |

MULTILAYER CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2011-0126590 filed on Nov. 30, 2011, in the Korean Intellectual Property Office, the disclosure of which is incorporated herein by reference.

BACKGROUND OF THE INVENTION

1. Field of the Invention

The present invention relates to a multilayer ceramic electronic component having excellent reliability by improving an influence of step height therein, and a method of manufacturing the same.

2. Description of the Related Art

In accordance with the recent trend for the miniaturization of electronic products, the demand for compact and high capacitance multilayer ceramic electronic components has increased.

Therefore, dielectric and inner electrode layers of multilayer ceramic electronic components have been thinned and increasingly layered through various methods. Recently, multilayer ceramic electronic components having a reduction in the thickness of dielectric layers while having an increased number of laminated layers have been manufactured.

As the thicknesses of the dielectric and inner electrode layers are reduced to secure high capacitance, the influence of step height may be increased due to the thicknesses of the inner electrodes.

As the influence of step height is increased, cracking may occur.

In addition, in a case in which inner electrodes are compressed and fill the empty step portion, discontinuity of the inner electrodes may be severe, resulting in deteriorated reliability.

Meanwhile, as the inner electrodes are thinned, the thicknesses thereof may not be uniform and may not be continuous, and thus, the inner electrodes may be partially disconnected, resulting in deteriorated connectivity.

Furthermore, as the inner electrodes are disconnected, the thicknesses of the dielectric layers may be partially increased or reduced. In this case, insulating properties may be deteriorated in portions in which the dielectric layers are thinned, whereby the reliability thereof may be deteriorated.

SUMMARY OF THE INVENTION

An aspect of the present invention provides a multilayer ceramic electronic component having excellent reliability by improving an influence of step height, and a method of manufacturing the same.

According to an aspect of the present invention, there is provided a multilayer ceramic electronic component, including: a ceramic body including dielectric layers; and first and second inner electrodes disposed to face each other with the dielectric layer interposed therebetween within the ceramic body, the first and second inner electrodes being alternately laminated with a difference in printing widths therebetween, wherein a difference ratio between the printing widths of the first and second inner electrodes is 20 to 80%.

The difference in printing widths between the first and second inner electrodes may be 100 μm or less.

The dielectric layer may have an average thickness of 0.6 μm or less.

The first and second inner electrodes may have an average thickness of 0.6 μm or less.

The difference ratio between the printing widths of the first and second inner electrodes may be 20 to 40% when, of the first and second inner electrodes, the electrode having the wider printing width has a printing width of 200 to 250 μm.

The difference ratio between the printing widths of the first and second inner electrodes may be 40 to 70% when, of the first and second inner electrodes, the electrode having the wider printing width has a printing width of 300 to 400 μm.

The difference ratio between the printing widths of the first and second inner electrodes may be 20 to 80% when, of the first and second inner electrodes, the electrode having the wider printing width has a printing width of 500 μm or more.

The first or second inner electrode may have continuity of 90% or more.

According to another aspect of the present invention, there is provided a method of manufacturing a multilayer ceramic electronic component, the method including: preparing ceramic green sheets with a slurry containing ceramic powder; forming inner electrode patterns on the ceramic green sheets, with a conductive metal paste; and laminating and sintering the resultant ceramic green sheets to thereby form a ceramic body including dielectric layers, and first and second inner electrodes disposed to face each other with the dielectric layer interposed therebetween, the first and second inner electrodes being alternately laminated with a difference in printing widths therebetween, wherein a difference ratio between the printing widths of the first and second inner electrodes is 20 to 80%.

The difference in printing widths between the first and second inner electrodes may be 100 μm or less.

The dielectric layer may have an average thickness of 0.6 μm or less.

The first and second inner electrodes may have an average thickness of 0.6 μm or less.

The difference ratio between the printing widths of the first and second inner electrodes may be 20 to 40% when, of the first and second inner electrodes, the electrode having the wider printing width has a printing width of 200 to 250 μm.

The difference ratio between the printing widths of the first and second inner electrodes may be 40 to 70% when, of the first and second inner electrodes, the electrode having the wider printing width has a printing width of 300 to 250 μm.

The difference ratio between the printing widths of the first and second inner electrodes may be 20 to 80% when, of the first and second inner electrodes, the electrode having the wider printing width has a printing width of 500 μm or more.

The first or second inner electrode may have continuity of 90% or more.

The ceramic green sheets may be laminated in an amount of 400 or more.

The conductive metal paste may include at least one metal selected from the group consisting of nickel (Ni), copper (Cu), palladium (Pd), and a palladium-silver (Pd—Ag) alloy.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of components may be exaggerated for clarity, and the same reference numerals will be used throughout to designate the same or like components.

Figure 1:
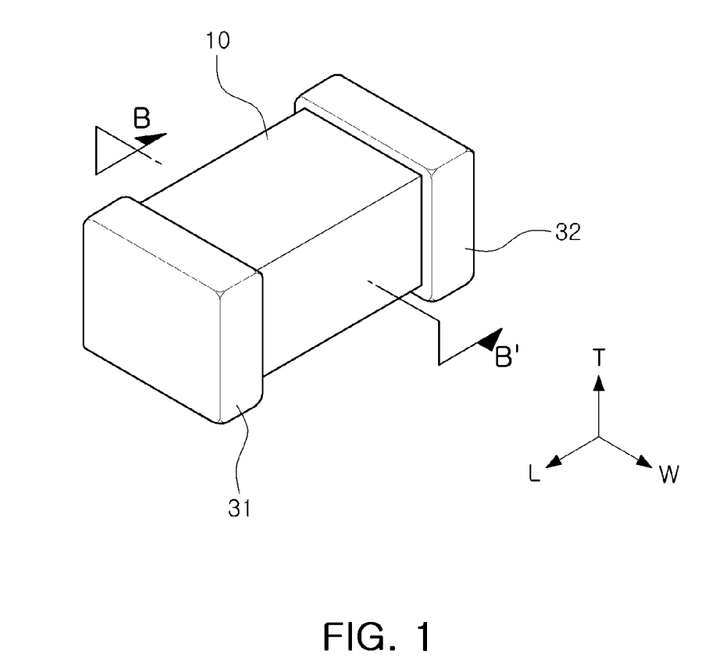
FIG. 1 is a schematic perspective view showing a multilayer ceramic capacitor according to an embodiment of the present invention.

FIG. 1 is a schematic perspective view showing a multilayer ceramic capacitor according to an embodiment of the present invention.

Figure 2:
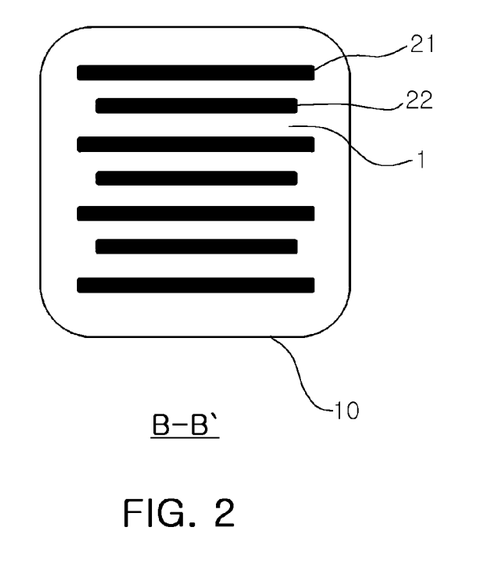
FIG. 2 is a cross-sectional view taken along line B-B' of FIG. 1 according to an embodiment of the present invention.

FIG. 2 is a cross-sectional view taken along line B-B' of FIG. 1 according to an embodiment of the present invention.

Figure 3:
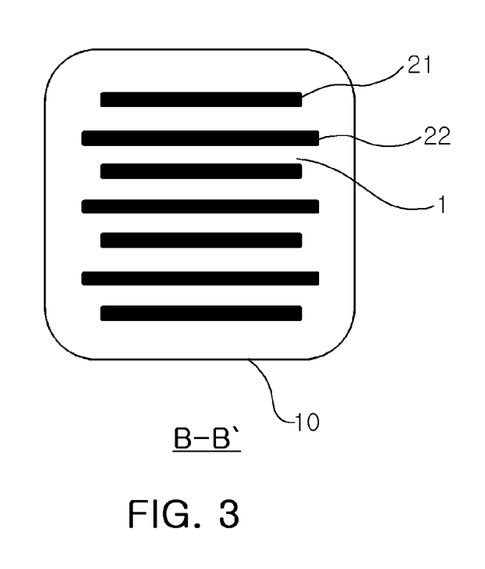
FIG. 3 is a cross-sectional view taken along line B-B' of FIG. 1 according to another embodiment of the present invention.

FIG. 3 is a cross-sectional view taken along line B-B' of FIG. 1 according to another embodiment of the present invention.

Referring to FIGS. 1 and 2, a multilayer ceramic electronic component according to an embodiment of the present invention may include a ceramic body 10 including dielectric layers 1; and first and second inner electrodes 21 and 22 disposed to face each other with the dielectric layer 1 interposed therebetween within the ceramic body 10, and being alternately laminated to have a difference in printing widths in a width direction. Here, a difference ratio between widths of the first and second inner electrodes 21 and 22 may be 20 to 80%.

Hereinafter, a multilayer ceramic electronic component according to an embodiment of the present invention, particularly, a multilayer ceramic capacitor, will be described, but the present invention is not limited thereto.

The ceramic body 10 may have, but is not particularly limited to, for example, a rectangular parallelepiped shape.

Meanwhile, in the multilayer ceramic capacitor of the present embodiment, a "length direction", a "width direction", and a "thickness direction" may be defined by an 'L' direction, a 'W' direction, and a 'T' direction, in FIG. 1. Here, the 'thickness direction' may be used to have the same meaning as a direction in which the dielectric layers are laminated, that is, a 'lamination direction'.

The first and second inner electrodes 21 and 22 may be formed with a conductive paste made of at least one of, for example, precious metal materials, such as palladium (Pd), palladium-silver (Pd—Ag) alloy, and the like, nickel (Ni), and copper (Cu), but are not particularly limited thereto.

In order to form capacitance, first and second outer electrodes 31 and 32 may be formed on external surfaces of the ceramic body 10 and may be electrically connected to the first and second inner electrodes 21 and 22.

The first and second outer electrodes 31 and 32 may be formed of the same conductive material as that of the inner electrodes, but are not limited thereto. For example, copper (Cu), silver (Ag), nickel (Ni), or the like may be used for the first and second outer electrodes 31 and 32.

The first and second outer electrodes 31 and 32 may be formed by coating a conductive paste and sintering it. Here, the conductive paste may be prepared by adding glass frit to a metal powder.

According to the embodiment of the present invention, the first and second inner electrodes 21 and 22 may be alternately laminated within the ceramic body 10 while having a difference in printing widths in a width direction.

As such, the first and second inner electrodes 21 and 22 are alternately laminated to have a difference in printing widths, thereby increasing a distance between inner electrodes having an influence on step height. In this manner, the influence of step height may be reduced.

Generally, as the dielectric layers and the inner electrodes are thinned in order to secure high capacitance in the multilayer ceramic capacitor, the influence of step height, due to the thicknesses of the inner electrodes, is increased. When the influence of step height is increased, cracking may occur.

In addition, in a case in which the inner electrodes are compressed and stretched to fill the empty step portion, discontinuity of the inner electrodes may be severe, resulting in deteriorated reliability.

According to the embodiment of the present invention, the above-described problem may be solved by alternately laminating the first and second inner electrodes 21 and 22 with a difference in printing widths therebetween. Thus, the occurrence of cracking can be decreased.

The difference ratio between the widths of the first and second inner electrodes 21 and 22 may be variously changed depending on the purpose of the present invention in order to minimize the influence of step height, and for example, the difference ratio may be 20 to 80%.

The first inner electrode 21 may have a wider printing width than the second inner electrode 22 or vice versa.

A case in which the first inner electrode 21 has a wider printing width is shown in FIG. 2, and a case in which the second inner electrode 22 has a wider printing width is shown in FIG. 3.

Referring to FIG. 2, in the inner electrodes of the multilayer ceramic capacitor according to an embodiment of the present invention, the first inner electrode 21 may have a wider printing width. Referring to FIG. 3, in the inner electrodes of the multilayer ceramic capacitor according to another embodiment of the present invention, the second inner electrode 22 may have a wider printing width.

Specifically, when, of the first and second inner electrodes 21 and 22, the electrode having the wider printing width has a printing width of 200 to 250 μm, the difference ratio between the widths of the first and second inner electrodes 21 and 22 may be 20 to 40%.

When the difference ratio is 20 to 40% as described above, the influence of step height is decreased to thereby reduce the occurrence of cracking while high capacitance is maintained, and the stretching of the electrode is suppressed, whereby a multilayer ceramic capacitor having improved withstand voltage and excellent reliability may be realized.

In the case in which the difference ratio between the widths of the first and second inner electrodes is below 20% when the electrode having the wider printing width has a printing width of 200 to 250 μm, the influence of step height is less decreased, such that cracking may occur.

In the case in which the difference ratio between the widths of the first and second inner electrodes exceeds 40% when the electrode having the wider printing width has a printing width of 200 to 250 μm, a reduction in capacitance may be caused.

Meanwhile, when, of the first and second inner electrodes 21 and 22, the electrode having the wider printing width has a printing width of 300 to 400 μM, the difference ratio between the widths of the first and second inner electrodes 21 and 22 may be 40 to 70%.

In the case in which the difference ratio is 40 to 70% as described above, the influence of step height is decreased to thereby reduce the occurrence of cracking while high capacitance is maintained, and the stretching of the electrode is suppressed, whereby a multilayer ceramic capacitor having improved withstand voltage and excellent reliability may be realized.

In the case in which the difference ratio between the widths of the first and second inner electrodes is below 40% when the electrode having the wider printing width has a printing width of 300 to 400 μm, the influence of step height is less decreased, such that cracking may occur.

In the case in which the difference ratio between the widths of the first and second inner electrodes exceeds 70% when the electrode having the wider printing width has a printing width of 300 to 400 μm, a reduction in capacitance may be caused.

When, of the first and second inner electrodes 21 and 22, the electrode having the wider printing width has a printing width of 500 μm or greater, the difference ratio between the widths of the first and second inner electrodes 21 and 22 may be 20 to 80%.

In the case in which the difference ratio is 20 to 80% as described above, the influence of step height is decreased to thereby reduce the occurrence of cracking while high capacitance is maintained, and the stretching of the electrode is suppressed, whereby a multilayer ceramic capacitor having improved withstand voltage and excellent reliability may be realized.

In the case in which the difference ratio between the widths of the first and second inner electrodes is below 20% when the electrode having the wider printing width has a printing width of 500 μm or greater, the influence of step height is less decreased, such that cracking may occur.

In the case in which the difference ratio between the widths of the first and second inner electrodes exceeds 80% when the electrode having the wider printing width has a printing width of 500 μm or more, a reduction in capacitance may be caused.

In addition, a difference in printing widths between the first and second inner electrodes 21 and 22 is not particularly limited, but may be 100 μm or less.

When the difference in printing widths is 100 μm or less, the occurrence of cracking may be decreased and reliability and withstand voltage characteristics may be enhanced while the capacitance of the multilayer ceramic capacitor is secured.

In other words, when the difference in printing widths exceeds 100 μm, the capacitance of the multilayer ceramic capacitor may be reduced by 50% or greater.

Therefore, in the multilayer ceramic capacitor according to the embodiment of the present invention, the difference in printing width between the first and second inner electrodes 21 and 22 may be 100 μm or less.

According to the embodiment of the present invention, the dielectric layer 1 may have an average thickness of 0.6 μm or less.

In the embodiment of the present invention, the thickness of the dielectric layer 1 may refer to an average thickness of the dielectric layer 1 disposed between the first and second inner electrodes 21 and 22.

The average thickness of the dielectric layer 1 may be measured from an image obtained by scanning a cross section in a width direction of the ceramic body 10 using a scanning electron microscope (SEM), as shown in FIG. 2.

For example, as shown in FIG. 2, the average thickness of the dielectric layer 1 may be obtained by measuring thickness at 30 equidistant points in the width direction of the ceramic body 10, on an image of a single dielectric layer extracted from the image obtained by scanning a cross section in the width-thickness (W-T) direction, which is cut in a central portion in the length (L) direction of the ceramic body 10.

The thickness at 30 equidistant points may be measured in a capacitance forming portion, referring to an area in which the first and second inner electrodes 21 and 22 overlap each other.

In addition, when this measurement process is extensively performed on ten or more dielectric layers and average values thereof are measured, the average thickness of the dielectric layer may be more generalized.

Although continuity of the first and second inner electrodes 21 and 22 may be decreased when the dielectric layer 1 has an average thickness of 0.6 μm or less, according to an embodiment of the present invention, the first and second inner electrodes 21 and 22 are alternately laminated with a difference in printing widths, thereby minimizing the influence of step height to allow continuity of the inner electrode to be increased.

In addition, when the dielectric layer 1 has an average thickness of 0.6 μm or less, the inner electrode is broken, such that the dielectric layer becomes partially thick or thin in spite of the same average thickness thereof, and thus withstand voltage characteristics and reliability may be deteriorated in a portion in which the dielectric layer is thinned. However, according to the embodiment of the present invention, continuity of the inner electrode is increased to thereby improve withstand voltage characteristics.

Meanwhile, when the average thickness of the dielectric layer 1 exceeds 0.6 μm, the above-described problems with regard to withstand voltage characteristics and reliability may not be caused.

The average thickness of the first and second electrodes 21 and 22 after sintering is not particularly limited as long as capacitance can be formed therebetween. For example, the average thickness may be 0.6 μm or less.

In the multilayer ceramic electronic component according to the embodiment of the present invention, continuity of the first or second inner electrode 21 or 22 may be 90% or more.

The continuity of the inner electrode may be defined as an actual total length of electrode portions of the first or second inner electrode 21 or 22, based on an ideal total length thereof.

For example, the continuity of the inner electrode may be measured from an image obtained by scanning a cross section in the width direction of the ceramic body 10 using a scanning electron microscope (SEM), as shown in FIG. 2.

Specifically, as shown in FIG. 2, the continuity of the inner electrode may be obtained by measuring the actual total length of electrode portions, based on the ideal total length of the inner electrode, on an image of any one inner electrode, which is extracted from an image obtained by scanning a cross section in the width-thickness (W-T) direction, which is cut in a central portion in the length (L) direction of the ceramic body 10.

The continuity of the first and second inner electrode 21 and 22 may be measured in a capacitance forming portion, referring to an area in which the first and second inner electrodes 21 and 22 overlap each other.

In addition, when this measurement process is extensively performed on ten or more inner electrodes in the central portion of the cross section in the length-thickness (L-T) direction and average values thereof are measured, the continuity of the inner electrode may be more generalized.

Specifically, when the ideal total length of the inner electrode is defined as A and lengths of electrode portions which are actually formed are defined as $c_1, c_2, c_3, \ldots,$ and $c_n$, the continuity of the first or second inner electrode may be expressed by $(c_1+c_2+c_3+\ldots+c_n)/A$.

In addition, the continuity of the inner electrode may refer to a coverage ratio of the inner electrode, and may be defined as a ratio of an actual total area of the electrode portions to an ideal total area of the inner electrode.

The continuity of the first or second inner electrode 21 or 22 may be variously realized depending on the methods to be described below, and the continuity of the first or second inner electrode of the multilayer ceramic electronic component according to an embodiment of the present invention may be 90% or more.

In order to realize the continuity of the first or second inner electrode 21 or 22 to be 90% or more, the size of metal powder particles in the conductive paste for forming the inner electrode may be varied or the amount of an organic material or ceramic material may be controlled.

In addition, a temperature rise rate and a sintering atmosphere may be adjusted during a sintering process to thereby control the continuity of the inner electrode.

According to the embodiment of the present invention, in order to realize the continuity of the inner electrode, a method of reducing the influence of step height by alternately laminating the first and second inner electrodes of the capacitance forming portion while having a difference in printing widths therebetween in the width (W) direction may be used.

According to the embodiment of the present invention, the continuity of the first or second inner electrode 21 or 22 is realized to be 90% or more, whereby a high-capacitance multilayer ceramic capacitor having increased capacitance and excellent reliability may be manufactured.

Figure 4:
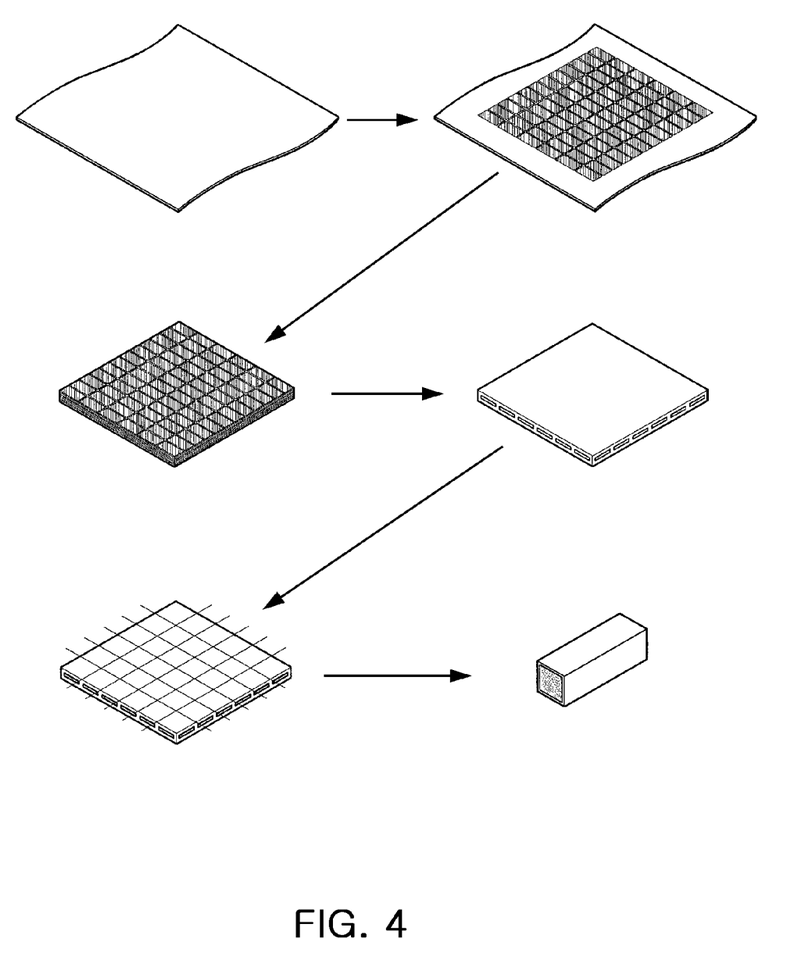
FIG. 4 is a view showing a process of manufacturing a multilayer ceramic capacitor according to another embodiment of the present invention.

FIG. 4 is a view showing a manufacturing process of a multilayer ceramic capacitor according to another embodiment of the present invention.

Referring to FIG. 4, a method of manufacturing a multilayer ceramic electronic component, according to another embodiment of the present invention, may include: preparing ceramic green sheets with a slurry containing a ceramic powder; forming inner electrode patterns on the ceramic green sheets, with a conductive metal paste; and laminating and sintering the resultant ceramic green sheets to thereby form a ceramic body including dielectric layers, and first and second inner electrodes disposed to face each other with the dielectric layer interposed therebetween, the first and second inner electrodes being alternately laminated while having a difference in printing widths therebetween. Here, a difference ratio between the widths of the first and second inner electrodes may be 20 to 80%.

The dielectric layer may have an average thickness of 0.6 μm or less, and the first and second inner electrodes may have an average thickness of 0.6 μm or less.

When, of the first and second inner electrodes, the electrode having the wider printing width has a printing width of 200 to 250 μm, the difference ratio between the widths of the first and second inner electrodes may be 20 to 40%.

When, of the first and second inner electrodes, the electrode having the wider printing width has a printing width of 300 to 400 μm, the difference ratio between the widths of the first and second inner electrodes may be 40 to 70%.

When, of the first and second inner electrodes, the electrode having the wider printing width has a printing width of 500 μm or greater, the difference ratio in the widths of the first and second inner electrodes may be 20 to 80%.

In addition, the continuity of the first or second inner electrode may be 90% or more.

The number of laminated ceramic green sheets is not particularly limited, and may be, for example, 400 or more in order to manufacture a high-capacitance multilayer ceramic electronic component.

When the number of lamination layers is below 400, the dielectric layers and the inner electrodes may be thick, and thus, there may not be problems in the continuity of the inner electrode and withstand voltage characteristics.

In other words, only when the number of lamination layers is 400 or more, the dielectric layers are thin, and thus, there may be problematic in the continuity of the inner electrodes, resulting in deteriorated withstand voltage characteristics. According to an embodiment of the present invention, the first and second inner electrodes 21 and 22 are alternately laminated with a difference in printing widths therebetween, thereby reducing the occurrence of cracking and increasing the continuity of the inner electrodes and withstand voltage characteristics.

The conductive metal paste may include, but is not particularly limited to, for example, 40 to 50 parts by weight of a metal powder. Here, the metal thereof may be at least one selected from the group consisting of nickel (Ni), copper (Cu), palladium (Pd), and a palladium-silver (Pd—Ag) alloy.

The method of manufacturing a multilayer ceramic electronic component according to the present embodiment is the same as a general method thereof, except that the first and second inner electrodes are alternately laminated with a difference in printing widths therebetween. Here, a difference ratio between the first and second inner electrodes is 20 to 80%.

The multilayer ceramic electronic component manufactured by the above-described manufacturing method may have a reduction in the influence of step height between the inner electrodes to thereby reduce the occurrence of cracking and increase the continuity of the inner electrode, whereby withstand voltage characteristics and reliability thereof may be enhanced.

Hereinafter, the present invention will be described in detail with reference to inventive and comparative examples, but is not limited thereto.

Experiments were conducted with respect to multilayer ceramic capacitors having the dielectric layers 1 having an average thickness of 0.6 μm or less, in order to test whether cracking is reduced and withstand voltage and reliability are improved in the case in which the first and second inner electrodes are alternately laminated with a difference ratio of 20 to 80% between the widths of the first and second inner electrodes.

Each multilayer ceramic capacitor according to the inventive examples was manufactured as follows.

First, a slurry including a powder of, for example, barium titanate ($BaTiO_3$) or the like, having an average particle size of 0.1 μm, was coated on a carrier film and dried to prepare a plurality of ceramic green sheets having a thickness of 1.05 μm or 0.95 μm, thereby forming dielectric layers 1.

Then, a conductive paste for inner electrodes, including 40 to 50 parts by weight of a nickel powder having an average particle size of 0.1 to 0.2 μm, was prepared.

The conductive paste for inner electrodes was coated on the ceramic green sheets by a screen printing method to thereby form inner electrodes, and then the resulting structures were then laminated in amounts of 400 to 500 layers to manufacture a laminate.

Then, compressing and cutting processes were performed to produce a chip having a 1005 standard size, and the chip was sintered at a temperature of 1050 to 1200° C. under a reduction atmosphere of $H_2$ of 0.1% or less.

Figure 5:
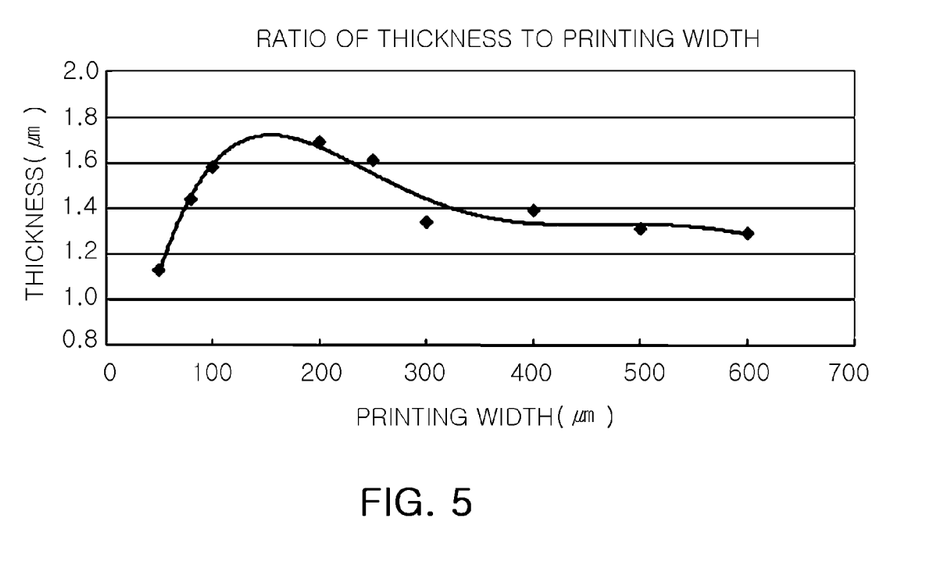
FIG. 5 is a graph showing the relationship between thicknesses of inner electrodes and printing widths thereof.

FIG. 5 is a graph showing the relationship between the thickness of the inner electrode and the printing width thereof.

Referring to FIG. 5, as the printing width of the inner electrode is reduced, the thickness thereof may be increased. Since the printing width of the inner electrode relates to capacitance thereof, the inner electrodes may be alternately laminated with a difference in printing widths, in consideration of the capacitance and the ratio of thickness to printing width.

Table 2 shows comparison in terms of the ratio of thickness to printing width when the inner electrodes are alternately laminated with a difference in printing widths.

|  |  | Printing Width of Electrode Having Narrow Width (μm) | | | | | | | | |
|---|---|---|---|---|---|---|---|---|---|---|
|  |  | 50 | 80 | 100 | 200 | 250 | 300 | 400 | 500 | 600 |
| Printing Width of Electrode Having Wide Width (μm) | 50 | 0.00 | — | — | — | — | — | — | — | — |
|  | 80 | 0.11 | 0.00 | — | — | — | — | — | — | — |
|  | 100 | 0.14 | 0.04 | 0.00 | — | — | — | — | — | — |
|  | 200 | 0.17 | 0.07 | 0.03 | 0.00 | — | — | — | — | — |
|  | 250 | 0.15 | 0.05 | 0.01 | −0.02 | 0.00 | — | — | — | — |
|  | 300 | 0.08 | −0.04 | −0.09 | −0.13 | −0.10 | 0.00 | — | — | — |
|  | 400 | 0.09 | −0.02 | −0.07 | −0.11 | −0.08 | 0.02 | 0.00 | — | — |
|  | 500 | 0.07 | −0.05 | −0.10 | −0.15 | −0.11 | −0.01 | −0.03 | 0.00 | — |
|  | 600 | 0.06 | −0.06 | −0.11 | −0.16 | −0.12 | −0.02 | −0.04 | −0.01 | 0.00 |

Then, an outer electrode forming process, a plating process, and the like were performed to manufacture a multilayer ceramic capacitor.

Multilayer ceramic capacitors according to the comparative examples were manufactured by the same method as those of the inventive examples, except for no difference in printing widths between the first and second inner electrodes.

Table 1 shows comparison in terms of step height rates according to the thicknesses of ceramic green sheets and the number of lamination layers thereof.

TABLE 1

|  | Thickness of Green Sheet (μm) | Number of Lamination Layers | Step Height Rate (%) | Remark (Thickness of Inner Electrode μm) |
|---|---|---|---|---|
| Comparative Examples | 0.5 | 500 | 50.0 | 0.5 |
|  | 0.7 | 400 | 41.7 |  |
|  | 1.0 | 300 | 33.3 |  |
| Inventive Examples | 0.5 | 500 | 25.0 |  |
|  | 0.7 | 400 | 20.8 |  |
|  | 1.0 | 300 | 16.7 |  |

Referring to Table 1, it could be seen that the step height rates with respect to the same thickness of the green sheet and the same number of lamination layers thereof were larger in the comparative examples than in the inventive examples.

In other words, it could be seen that, in the multilayer ceramic capacitor according to an embodiment of the present invention, the step height rate was reduced by alternately laminating the first and second inner electrodes with the width difference ratio therebetween of 20 to 80%.

The step height rate (%) may be obtained by (thickness of inner electrode×number of lamination layers)/{(thickness of green sheet+thickness of inner electrode)×number of lamination layers}}.

Referring to Table 2, when the ratio of thickness to printing width has a negative (−) value, the influence of step height could be minimized. Accordingly, the difference ratio in printing widths for minimizing the influence of step height can be obtained.

In other words, when, of the first and second inner electrodes, the electrode having the wider printing width has a printing width of 200 to 250 μm, the difference ratio between the widths of the first and second inner electrodes may be 20 to 40%.

When, of the first and second inner electrodes, the electrode having the wider printing width has a printing width of 300 to 400 μm, the difference ratio between the widths of the first and second inner electrodes may be 40 to 70%.

When, of the first and second inner electrodes, the electrode having the wider printing width has a printing width of 500 μm or more, the difference ratio between the widths of the first and second inner electrodes may be 20 to 80%.

Table 3 shows comparison in terms of the occurrences of cracking, capacitance, withstand voltage, and high-temperature accelerated lifespan failure in the inventive examples and the comparative examples.

TABLE 3

|  | Occurrence of Cracking (%) | Capacitance (μF) | Withstand Voltage (V) | High-temperature Accelerated Lifespan Failure (FIT) |
|---|---|---|---|---|
| Comparative Example | 5 | 12.7 | 40 | 14 |
| Inventive Example | 2 | 11.8 | 43 | 6 |

Referring to Table 3, it could be seen that the multilayer ceramic capacitor according to the inventive example had a slight reduction in capacitance as compared with that according to the comparative example, but the occurrence of cracking was reduced from 5% to 2%, and the reliability and withstand voltage characteristics were improved.

Figure 6:
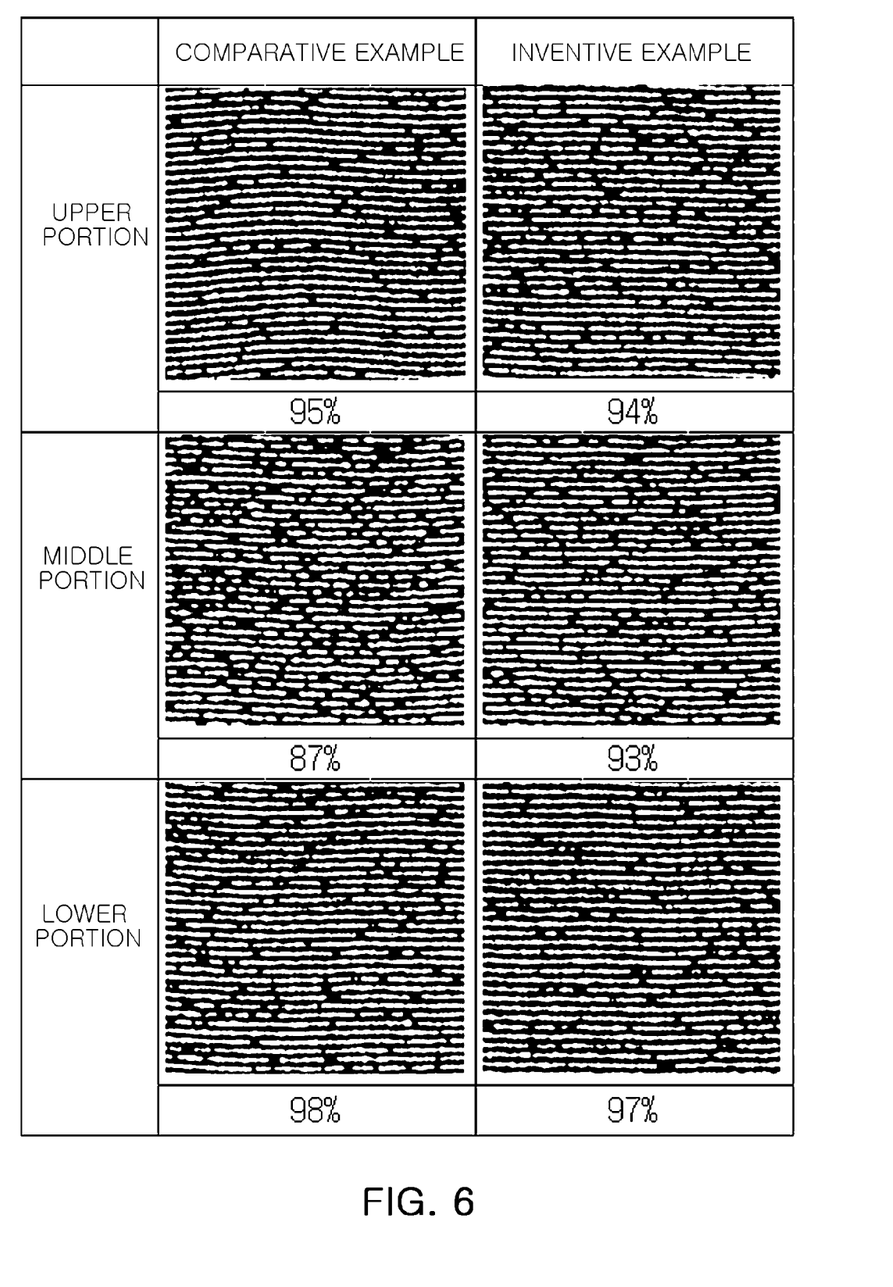
FIG. 6 shows scanning electron microscope (SEM) images illustrating continuity in different portions of inner electrodes in Inventive Example and Comparative Example.

FIG. 6 shows scanning electron microscope (SEM) images illustrating continuity in different portions of the inner electrode in the inventive example and the comparative example.

Referring to FIG. 6, the continuity of the inner electrode was 90% or more in the multilayer ceramic capacitor according to the inventive example of the present invention, and thus, the continuity of the inner electrode was more uniform throughout the entire portions of the inner electrode in the inventive example than in the comparative example.

Figure 7:
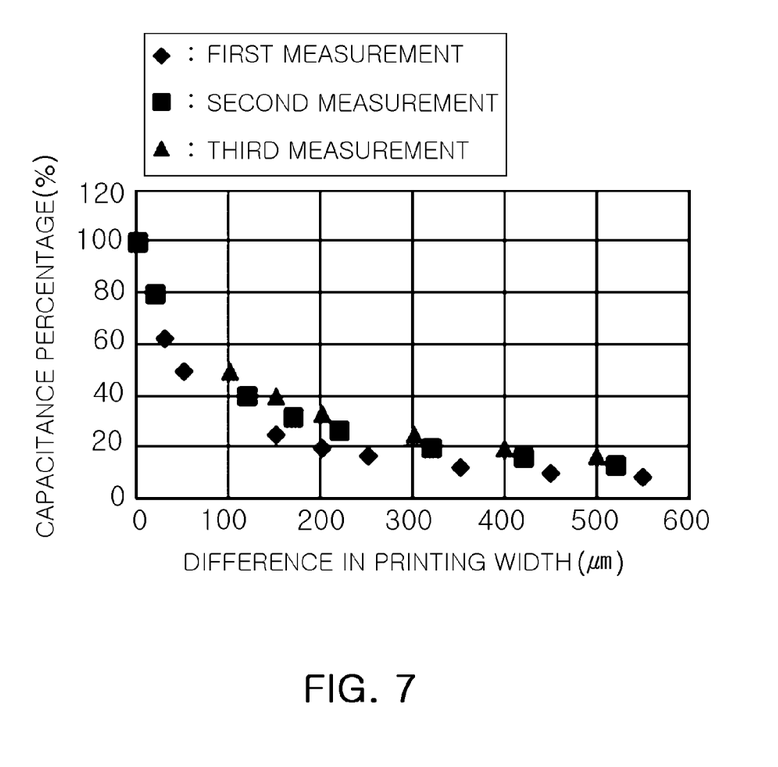
FIG. 7 is a graph showing capacitance percentage of a multilayer ceramic capacitor according to a difference in printing widths between first and second inner electrodes.

FIG. 7 is a graph showing capacitance percentage of a multilayer ceramic capacitor according to a difference in printing widths between the first and second inner electrodes.

Referring to FIG. 7, when the difference in printing widths exceeds 100 μm, the capacitance of the multilayer ceramic capacitor may be reduced by 50% or more.

Therefore, according to the embodiment of the present invention, the difference in printing widths between the first and second inner electrodes may be 100 μm or less.

In conclusion, in the multilayer ceramic electronic component according to the embodiment of the present invention, the influence of step height between the inner electrodes can be minimized to thereby reduce the occurrence of cracking and increase the continuity of the inner electrode, and thus, excellent reliability and withstand voltage characteristics can be achieved.

As set forth above, according to embodiments of the present invention, a multilayer ceramic electronic component having excellent reliability and withstand voltage characteristics can be realized, by reducing the occurrence of cracking through a reduction in the influence of step height while securing high capacitance.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
   a ceramic body including dielectric layers; and
   first and second inner electrodes disposed to face each other with the dielectric layer interposed therebetween within the ceramic body, the first and second inner electrodes being alternately laminated with a difference in printing widths therebetween,
   wherein in the case that the electrode of the first and second inner electrodes having the wider printing width has a printing width of 200 to 250 μm, the different ratio between the printing widths of the first and second inner electrodes is 20 to 40%.

2. The multilayer ceramic electronic component of claim 1, wherein the difference in printing widths between the first and second inner electrodes is 100 μm or less.

3. The multilayer ceramic electronic component of claim 1, wherein the dielectric layer has an average thickness of 0.6 μm or less.

4. The multilayer ceramic electronic component of claim 1, wherein the first and second inner electrodes have an average thickness of 0.6 μm or less.

5. A multilayer ceramic electronic component, comprising:
   a ceramic body including dielectric layers; and
   first and second inner electrodes disposed to face each other with the dielectric layer interposed therebetween within the ceramic body, the first and second inner electrodes being alternately laminated with a difference in printing widths therebetween,
   wherein in the case that the electrode of the first and second inner electrodes having the wider printing width has a printing width of 300 to 400 μm, the difference ratio between the printing widths of the first and second inner electrodes is 40 to 70%.

6. A multilayer ceramic electronic component, comprising:
   a ceramic body including dielectric layers; and
   first and second inner electrodes disposed to face each other with the dielectric layer interposed therebetween within the ceramic body, the first and second inner electrodes being alternately laminated with a difference in printing widths therebetween,
   wherein in the case that the electrode of the first and second inner electrodes having the wider printing width has a printing width of 500 μm or more, the difference ratio between the printing widths of the first and second inner electrodes is 20 to 80%.

7. The multilayer ceramic electronic component of claim 1, wherein the first or second inner electrode has continuity of 90% or more.

* * * * *